United States Patent [19]

Pryor et al.

[11] Patent Number: 4,877,765
[45] Date of Patent: Oct. 31, 1989

[54] ADSORPTIVE MATERIAL FOR THE REMOVAL OF CHLOROPHYLL, COLOR BODIES AND PHOSPHOLIPIDS FROM GLYCERIDE OILS

[75] Inventors: James N. Pryor, West Friendship; James M. Bogdanor, Columbia; William A. Welsh, Fulton, all of Md.

[73] Assignee: W. R. Grace & Co., New York, N.Y.

[21] Appl. No.: 50,998

[22] Filed: May 15, 1987

[51] Int. Cl.$^4$ .............................................. B01J 20/10
[52] U.S. Cl. .................................................. 502/408
[58] Field of Search ................................ 502/408, 414

[56] References Cited

U.S. PATENT DOCUMENTS

| | | | |
|---|---|---|---|
| 2,027,948 | 1/1936 | Wollner et al. | 502/408 |
| 2,044,341 | 6/1936 | Wollner | 502/408 |
| 4,049,686 | 9/1977 | Ringers et al. | 260/424 |
| 4,443,379 | 4/1984 | Taylor et al. | 260/427 |
| 4,629,588 | 12/1986 | Welsh et al. | 260/428 |
| 4,734,226 | 3/1988 | Parker et al. | 502/408 |

FOREIGN PATENT DOCUMENTS 865807 4/1961 United Kingdom .

OTHER PUBLICATIONS

GB 865,807 Unilever Ltd. JAOCS, Mag. (abstract).
SU 757591, Arutyunyan et al., (abstract).
The Handbook of Soy Oil Processing, Erickson et al., Ed. "Activated Clays for Chlorophyll Removal", p. 111 (1980).
The Alfa-Laval AB Research Disclosure, "Removal of Nonhydratable Phosphatides (NHP) from Vegetable Oils" (abstract).
The Vinyukova et al., Article "Hydration of Vegetable Oils by Solutions of Polarizing compounds" (abstract).

Primary Examiner—Carl F. Dees
Attorney, Agent, or Firm—Jill H. Krafte

[57] ABSTRACT

Acid-treated amorphous silica has superior properties for the removal of phospholipids and chlorophyll from glyceride oils. The acid-treated adsorbent comprises a high surface area amorphous silica on which is supported an acid having a $pK_a$ of about 3.5 or lower.

20 Claims, No Drawings

ADSORPTIVE MATERIAL FOR THE REMOVAL OF CHLOROPHYLL, COLOR BODIES AND PHOSPHOLIPIDS FROM GLYCERIDE OILS

BACKGROUND OF THE INVENTION

This invention relates to refining of glyceride oils by contacting the oils with an adsorbent capable of selectively removing trace contaminants. More specifically, it has been found that novel acid-treated silica supports have superior properties for the removal of chlorophyll and phospholipids from glyceride oils. This facilitates the production of oil products with substantially lowered concentrations of these trace contaminants. The term "glyceride oils" as used herein is intended to encompass all lipid compositions, including vegetable oils and animal fats and tallows. This term is primarily intended to describe the so-called edible oils, i.e., oils derived from fruits or seeds of plants and used chiefly in foodstuffs, but it is understood that oils whose end use is as non-edibles (i.e., technical grade oils) are to be included as well. It should be recognized that the method of this invention also can be used to treat fractionated streams derived from these sources.

Refining of crude glyceride oil purifies the oil of many undesirable substances, including color components (such as chlorophyll A and red and yellow color bodies), phospholipids, free fatty acids and other volatile species that impart undesirable colors, flavors and odors to the oil. Removal of these species results in oil having good appearance, flavor, odor and stability. Many of these species are removed by contacting the oil with an adsorbent (i.e., bleaching earths or amorphous silica). Various forms of acid treatment also have been used at different stages of the refining process, and for different purposes, in the oil refining industry.

Crude glyceride oils, particularly vegetable oils, are refined by a multi-stage process, the first step of which is degumming by treatment typically with water or with a chemical such as phosphoric acid, citric acid or acetic anhydride. For example, Vinyukova et al., "Hydration of Vegetable Oils by Solutions of Polarizing Compounds," Food and Feed Chem., Vol. 17-9, pp. 12-15 (1984), discloses degumming using a hydration agent containing citric acid, sodium chloride and sodium hydroxide in water to increase the removal of phospholipids from sunflower and soybean oils. U.S. Pat. No. 4,049,686 (Ringers et al.) discloses dispersing a substantially concentrated acid or anhydride in the oil, adding water and separating the aqueous phase containing gums and phospholipids. In addition to the use of organic acids during oil degumming, citric acid and other weak acids have been used as trace metal deactivating agents to promote taste and oxidative stability of edible oils.

After degumming, the oil may be refined either by a chemical process including neutralization, bleaching and deodorizing steps or a physical process may be used, including a pretreating and bleaching step and a steam refining and deodorizing step. The removal of phospholipids and chlorophyll from edible oils has been the object of a number of previously proposed physical and chemical process steps. Clays or bleaching earths most commonly have been used for removing phospholipids and color bodies from glyceride oils. These adsorbents may be used in their naturally occurring form or they may be acid-activated prior to use. U.S. Pat. No. 4,443,379 (Taylor et al.) describes the bleaching clays and acid-activation method commonly used for this purpose, noting that Fuller's earth and acid-treated sub-bentonites have an adsorptive capacity for color impurities in oils and that the acid-treated sub-bentonites have the highest adsorptive capacity.

It is also known that amorphous silicas may be used in the oil refining process. U.S. Pat. No. 4,629,588 (Welsh et al.) teaches the utility of amorphous silica adsorbents for the removal of trace contaminants, specifically phospholipids and associated metal ions, from glyceride oils, (Parker et al.) (U.S. Pat. No. 4,734,226), teaches the removal of these trace contaminants by adsorbing onto amorphous silica which has been treated with an organic acid, such as citric acid, tartaric acid, acetic acid or ascorbic acid. Direct color improvement of glyceride oils has not previously been associated with the use of silica adsorbents in the bleaching step, although treatment with silica does facilitate and improve the decolorization which takes place in subsequent deodorization.

In current refinery practice, chlorophyll is most efficiently removed from glyceride oils by the use of acid-activated clays. Although commonly used in the industry, clays and bleaching earths suffer from a number of disadvantages. They typically do not filter well and are associated with significant oil losses. Moreover, spent bleaching earth has a tendency to undergo spontaneous combustion, making its handling somewhat hazardous.

SUMMARY OF THE INVENTION

This invention teaches that color bodies and phospholipids can be removed effectively from glyceride oils by treatment with high surface area amorphous silica compositions having an acid supported thereon. It has been found that the presence of a strong acid in the pores of the silica adsorbent greatly improves its ability to remove chlorophyll, as well as red and yellow color bodies. The inherent ability of amorphous silica to adsorb phospholipids is not lost or compromised by the acid treatment described herein. The compositions described utilize amorphous silicas on which an acid has been supported in such a manner that at least a portion of the acid is retained in the pores of the silica.

It is the primary object of this invention to provide a novel composition and method for reducing the chlorophyll and phospholipid content of degummed oils to acceptable levels. Adsorption of phospholipids and chlorophyll onto acid-treated amorphous silica in the manner described can eliminate any need to use clay or bleaching earth adsorbents in the refining process. Elimination of clay or bleaching earth results in increased on-stream filter time in the refining operation due to the superior filterability of the silica adsorbent. Moreover, the adsorbent of this invention avoids significant oil losses previously associated with the clay or bleaching earth filter cake. Still further, lower adsorbent usages or loadings (wet or dry basis) can be achieved than would be required using clays or bleaching earths.

The use of the acid-treated silica adsorbent is substantially more efficient and more economical than separate treatments with acid and with adsorbent would be. The acid alone is not easily miscible in the oil and one function of the silica adsorbent is to facilitate dispersion of the supported acid in the oil. Treatment may be followed by a simple physical separation of the solid adsorbent from the liquid oil. Moreover, separate storage of the acid is eliminated, as is the separate process step for the addition of the acid. Separate acid treatment would also require centrifugal separation of the acid from oil or the use of large quantities of solids such as bleaching earth to absorb the separated phase.

DETAILED DESCRIPTION OF THE INVENTION

It has been found that acid-treated amorphous silicas are particularly well suited for removing phospholipids and/or chlorophyll from glyceride oils to yield oils having commercially acceptable levels of those contaminants. In addition to chlorophyll, red and yellow color bodies also may be substantially reduced. The adsorbent of this invention comprises a high surface area amorphous silica and an acid supported thereon. The acid supported on the amorphous silica has a $pK_a$ of about 3.5 or lower. The acid-treated adsorbent is characterized by having an acidity factor (defined below) of at least about $2.0 \times 10^{-8}$ and a pH of about 3.0 or lower. The process for the removal of these contaminants, as described in detail herein, essentially comprises contacting a glyceride oil containing phospholipids or chlorophyll or both with the adsorbent of this invention, allowing the phospholipids and/or chlorophyll to be adsorbed, and separating the treated oil from the adsorbent. Hereafter, reference to removal or reduction of chlorophyll shall refer to decolorization of the oil, that is, it shall also be intended to encompass removal or reduction of red and yellow color bodies, whether or not in the presence of chlorophyll, unless otherwise noted.

The process described herein can be used for the removal of chlorophyll and/or phospholipids from any glyceride oil, for example, oils of soybean, rapeseed (canola), peanut, corn, sunflower, palm, coconut, olive, cottonseed, etc. Chlorophyll is produced only in plants and this invention is therefore intended primarily for use with vegetable oils. However, it may be desired to treat animal fats and tallows, or other oils which contain little or no chlorophyll, in this manner for removal of dietary chlorophyll or for removal of other color bodies. It is chlorophyll A which is of greatest concern here, but references herein to chlorophyll will be understood to refer to all relevant forms of chlorophyll, or their degradation products, such as pheophytin. Removal of chlorophyll from vegetable oils is a significant step in refining vegetable oils because the chlorophyll imparts an unacceptably high level of green coloring to the oil. In addition, chlorophyll has been implicated as a factor in the instability of oils on exposure to light. Chlorophyll levels vary dramatically from oil to oil, as well as from crop to crop, depending on growing and harvesting conditions. Although target chlorophyll values vary from refiner to refiner, the target values for bleached oils and for deodorized oils typically are in the range of about 0.05 to about 0.15 ppm or less.

Removal of phospholipids from edible oils also is a significant step in the oil refining process because residual phosphorus can cause off colors, odors and flavors in the finished oil. Typically, the acceptable concentration of phosphorus in the finished oil product should be less than about 15.0 ppm, preferably less than about 5.0 ppm, according to general industry practice. As an illustration of the refining goals with respect to trace contaminants, typical phosphorus levels in soybean oil at various stages of chemical refining are shown in Table I. Phosphorus levels at corresponding stages in physical refining processes will be comparable.

TABLE I[1]

| Stage | Trace Contaminant Levels (ppm) | | | | |
|---|---|---|---|---|---|
| | P | Ca | Mg | Fe | Cu |
| Crude Oil | 450-750 | 1-5 | 1-5 | 1-3 | 0.03-0.05 |
| Degummed Oil | 60-200 | 1-5 | 1-5 | 0.4-0.5 | 0.02-0.04 |
| Caustic Refined Oil | 10-15 | 1 | 1 | 0.3 | 0.003 |
| End Product | 1-15 | 1 | 1 | 0.1-0.3 | 0.003 |

[1]Data assembled from the Handbook of Soy Oil Processing and Utilization, Table I, p. 14 (1980), and from FIG. 1 from Christenson, Short Course: Processing and Quality Control of Fats and Oils, presented at American Oil Chemists' Society, Lake Geneva, WI (May 5-7 1983).

In conjunction with phospholipid removal, the process of this invention also removes from edible oils ionic forms of the metals calcium, magnesium, iron and copper, which are believed to be chemically associated with phospholipids. These metal ions themselves have a deleterious effect on the refined oil products. Calcium and magnesium ions can result in the formation of precipitates. The presence of iron and copper ions promote oxidative instability. Moreover, each of these metal ions is associated with catalyst poisoning where the refined oil is catalytically hydrogenated. Typical concentrations of these metals in soybean oil at various stages of chemical refining are shown in Table I. Metal ion levels at corresponding stages of physical refining processes will be comparable. Throughout the description of this invention, unless otherwise indicated, reference to the removal of phospholipids is meant to encompass the removal of associated trace contaminants as well.

The term "amorphous silica" as used herein is intended to embrace silica gels, precipitated silicas, dialytic silicas and fumed silicas in their various prepared or activated forms. The specific manufacturing process used to prepare the amorphous silica is not expected to affect its utility in this method. Acid treatment of the amorphous silica adsorbent selected for use in this invention may be conducted as a step in the silica manufacturing process or at a subsequent time. The acid treatment process is described below.

Both silica gels and precipitated silicas are prepared by the destabilization of aqueous silicate solutions by acid neutralization. In the preparation of silica gel, a silica hydrogel is formed which then typically is washed to low salt content. The washed hydrogel may be milled, or it may be dried, ultimately to the point where its structure no longer changes as a result of shrinkage. The dried, stable silica is termed a xerogel. In the preparation of precipitated silicas, the destabilization is carried out in the presence of inorganic salts, which lower the solubility of silica and cause precipitation of hydrated silica. The precipitate typically is filtered, washed and dried. For preparation of xerogels or precipitates useful in this invention, it is preferred to dry them and then to add water to reach the desired water content before use. However, it is possible to initially dry the gel or precipitate to the desired water content. Dialytic silica is prepared by precipitation of silica from a soluble silicate solution containing electrolyte salts (e.g., $NaNO_3$, $Na_2SO_4$, $KNO_3$) while electrodialyzing, as described in pending U.S. Pat. application Ser. No. 533,206 (Winyall), "Particulate Dialytic Silica," filed Sept. 20, 1983 (U.S. Pat. No. 4,508,607). Fumed silicas (or pyrogenic silicas) are prepared from silicon tetrachloride by high-temperature hydrolysis, or other convenient methods.

In the preferred embodiment of this invention, the selected silica adsorbent will have the highest possible surface area, while being capable of maintaining good structural integrity upon contact with fluid media. The requirement of structural integrity is particularly important where the silica adsorbents are used in continuous flow systems, which are susceptible to disruption and plugging. Amorphous silicas suitable for use in this process have surface areas of at least about 200, preferably at least about 300 and most preferably at least about 350 square meters per gram, as measured by the nitrogen B-E-T method described in Brumauer et al., J. Am. Chem. Soc., Vol. 60, p. 309 (1938). Amorphous silicas meeting this description will be considered "high surface area" silicas as that term is used herein. The adsorbent of this invention demonstrates excellent capacity independent of pore diameter, although pores large enough to permit access of phospholipid and chlorophyll molecules are beneficial.

The purity of the amorphous silica used in this invention is not believed to be critical in terms of the adsorption capacities, although increased purity is associated with increased adsorbent capacity. Where the finished products are intended to be food grade oils, care should be taken to ensure that the silica used does not contain leachable impurities which could compromise the desired purity of the product(s). It is preferred, therefore, to use a substantially pure amorphous silica, although minor amounts, i.e., less than about 10%, of other inorganic constituents may be present. For example, suitable silicas may comprise iron as $Fe_2O_3$, aluminum as $Al_2O_3$, titanium as $TiO_2$, calcium as CaO, sodium as $Na_2O$, zirconium as $ZrO_2$, and/or trace elements. Silica compositions of lower purity can be used, if desired. For example, silica aluminas with greater than 10% alumina have been found to be acceptable, as demonstrated in Examples III and XIV.

It has been found that the effectiveness of amorphous silicas of this description in removing chlorophyll and red and yellow color bodies from glyceride oils is dramatically improved by pre-treating the silica with an acid. At the same time, the silica adsorbent remains quite effective in removing phospholipids. In fact, it is one of the novel features of this invention that the acid treatment described herein significantly increases the capacity of the silica for phospholipid removal, in addition to adding capacity for chlorophyll removal.

Any acid meeting the characteristics described here will be suitable for preparation of the adsorbent of this invention. The acid can be of any type —— inorganic, organic or acidic salt —— but must have a $pK_a$ of about 3.5 or lower. Inorganic acids are preferred. In the preferred embodiment, the acid will be a mineral acid, with the stronger acids being the most effective. Sulfuric acid is the most preferred, both for its effectiveness and for its ability to remain supported on the silica. Phosphoric acid is effective for adsorption, but has a tendency to come off the silica into the oil, which may make it less desirable in certain applications. Alternatively, hydrochloric acid may be used. The acids may be used singly or in combination.

Strong organic acids also may be supported on the silica for use in this invention. Typically, these will be modified organic acids such as toluene sulfonic acid, trifluoroacetic acid and the like. Alternatively, acidic salts, such as magnesium sulfate, aluminum chloride, and the like, may be used in this invention.

The possible acid-base interaction of the acid with the support should be considered when selecting the two materials. The pH of the acid-treated adsorbent should be less than or equal to about 3.0 when measured as the pH of a 5.0 wt % (dry basis) slurry of the adsorbent in de-ionized water. In other words, there should be sufficient free acid available in the acid-treated adsorbent beyond any amounts of acid which may interact with the support material. The acid content of the acid-treated adsorbent should be at least about 1.0 wt %, preferably about 3.0 to about 10.0 wt %, and most preferably about 5.0 wt%, based on the dry weight of the amorphous silica. Persons of ordinary skill in the art will be capable of selecting appropriate acids for support on the amorphous silica in order to achieve this overall product pH.

Treatment of the silica may be with neat acid or with an aqueous acid solution. The acid strength and concentration on the support should be such that:

$$\text{Acidity Factor} = K_a \times \frac{\text{Moles of Acid}}{\text{Grams of Support}} \geq 2.0 \times 10^{-8}$$

where $K_a$ is the dissociation constant of the acid. It will be appreciated that the acid strength and concentration may be easily adjusted to achieve an acidity factor in this range.

It is desired to support a sufficient amount of acid on the silica that the total volatiles content of the acid-treated silica is about 10 wt % to about 80 wt %, preferably at least about 30 wt %, and most preferably about 40 to 80 wt %.

The amorphous silica can be treated with the acid or acidic solution in several ways. First, the silica may be slurried in the acidic solution for long enough for the acid to enter the pores of the silica, typically a period of at least about one half hour, up to about twenty hours. The slurry preferably will be agitated during this period to increase entry of the acid into the pore structure of the amorphous silica. The acid-treated silica is then conveniently separated from the solution by filtration and may be dried to the desired total volatiles content.

Alternatively, the acid solution can be introduced to the amorphous silica in a fixed bed configuration, for a similar period of contact. This would be particularly advantageous for treating unsized, washed silica hydrogel, since it would eliminate the standard dewatering/filtration step in processing the hydrogel. A third method is by introducing a fine spray or jet of the organic solution into the amorphous silica as it is fed to a milling/sizing operation or at any other convenient step. These latter two methods will be preferred for treating silica in a commercial scale operation.

The adsorption step itself is accomplished by conventional methods in which the acid-treated amorphous silica and the oil are contacted, preferably in a manner which facilitates the adsorption. The adsorption step may be by any convenient batch or continuous process. In any case, agitation or other mixing will enhance the adsorption efficiency of the treated silica.

The adsorption may be conducted at any convenient temperature at which the oil is a liquid. Typically, the oil temperature will be between 80 and 150° C, preferably about 90 to about 110° C. The glyceride oil and acid-treated silica are contacted as described above for a period sufficient to achieve the desired phospholipid content in the treated oil. The specific contact time will vary somewhat with the selected process, i.e., batch or continuous, and with the condition of the oil to be treated. In addition, the adsorbent usage, that is, the relative quantity of adsorbent brought into contact with the oil, will affect the amount of phospholipids removed. The adsorbent usage is quantified as the weight percent of amorphous silica (on a dry weight basis after ignition at 1750° F), calculated on the weight of the oil processed.

The adsorbent usage may be from about 0.003% to about 5.0 wt %, preferably less than about 1.0 wt %, most preferably about 0.05 to about 0.5 wt % (dry basis). As seen in the Examples, significant reduction in chlorophyll and phospholipid content is achieved by the method of this invention. The natural phospholipid adsorption capacity of the amorphous silica is not lost or reduced by the presence of a strong acid supported on the silica adsorbent. In fact, the phospholipid capacity is enhanced significantly by the presence of the acid in the pores of the adsorbent. The acid-treated silica adsorbent of this invention therefore continues to be quite effective in removing phospholipids from glyceride oils. The specific phosphorus content of the treated oil will depend primarily on the oil itself, as well as on the silica, usage, process, etc. However, phosphorus levels of less than 15 ppm, preferably less than 5.0 ppm, can be achieved.

The Examples which follow also demonstrate significant reduction in chlorophyll content of vegetable oils using the acid-treated silica adsorbents of this invention. These adsorbents dramatically outperform treatments with amorphous silica alone, acid alone, and sequential treatment with acid followed by treatment with amorphous silica, none of which have any appreciable impact on chlorophyll levels. In sharp contrast, the acid-treated silicas of this invention substantially reduced chlorophyll content, with some of the adsorbents completely removing chlorophyll from the oil samples. As with phospholipids, the chlorophyll content of the treated oil will depend on the oil itself, as well as the acid-treated silica adsorbent, usage, process, etc. The chlorophyll level can be reduced below about 5.0 ppm, preferably below about 1.0 ppm, and most preferably below about 0.1 ppm. Red color levels can be reduced to below about 5.0, preferably below about 1.0. Yellow color levels can be reduced below about 10.0. Red and yellow color is conveniently measured by tintometer according to the AOCS Color Scales.

Following adsorption, the phospholipid-and/or-chlorophyll-enriched adsorbent is filtered from the phospholipid-and/or-chlorophyll-depleted oil by any convenient filtration means. The oil may be subjected to additional finishing processes, such as steam refining, bleaching and/or deodorizing. The method described herein may reduce the phosphorus levels sufficiently to completely eliminate the need for bleaching earth steps. Moreover, with the reduction in chlorophyll levels achieved with the use of acid-treated adsorbents of this invention, treatment with bleaching earth will no longer be necessary for reduction of chlorophyll levels. In addition to removing the phospholipids and chlorophyll, the described treatment method increases the capacity of the oil to be decolorized, allowing other color bodies to be removed without difficulty during deodorization.

Even where bleaching earth operations are to be retained in the refining process for decolorizing the oil, treatment with both acid-treated amorphous silica and bleaching earth provides an extremely efficient overall process. Treatment may be either sequential or simultaneous. For example, by first using the method of this invention to decrease the phospholipid and/or chlorophyll content, and then treating with bleaching earth, the latter step is caused to be more effective. Therefore, either the quantity of bleaching earth required can be significantly reduced, or the bleaching earth will operate more effectively per unit weight. Significantly, the total quantity of adsorbent used in a dual treatment process will be less than the amount required for bleaching earth alone. Pretreatment (or simultaneous treatment) of the oil with untreated amorphous silica prior to use of the acid-treated silica adsorbent of this invention will serve to even further increase the capacity of the adsorbent of this invention for chlorophyll.

The examples which follow are given for illustrative purposes and are not meant to limit the invention described herein. The following abbreviations have been used throughout in describing the invention:

A — Angstrom(s)
APD — average pore diameter
B-E-T — Brunauer-Emmett-Teller
Ca — calcium
cc — cubic centimeter(s)
Chl A — chlorophyll A
cm — centimeter
Cu — copper
°C — degrees Centigrade
°F — degrees Fahrenheit
Fe — iron
gm — gram(s)
ICP — Inductively Coupled Plasma
m — meter
Mg — magnesium
min — minutes
ml — milliliter(s)
P — phosphorus
ppm — parts per million
% — percent
PV — pore volume
SA — surface area
sec — seconds
TV — total volatiles
wt — weight

EXAMPLE I (Preparation of Sulfuric Acid/Silica Gel Adsorbent)

A sulfuric acid solution was prepared by adding 3.0 gm concentrated $H_2SO_4$ to 36.0 gm de-ionized water. This solution was sprayed onto 68.1 gm of Sylodent TM 700 silica gel (Davison Chemical Division of W. R. Grace & Co.) (SA~700 $m^2$/gm). This preparation (5 wt % $H_2SO_4$) was designated Adsorbent IA. Similar preparations were made with higher acid loadings and designated as Adsorbent IB (10 wt % $H_2SO_4$), Adsorbent IC (20 wt % $H_2SO_4$) and Adsorbent ID (5 wt % $H_2SO_4$, dried to 23 wt % TV).

EXAMPLE II (Preparation of Phosphoric Acid/Silica Gel Adsorbent)

A 10.7 wt % aqueous solution of $H_3PO_4$ was prepared and 112.0 gm of that solution was added to 30.0 gm of Tri-Syl TM silica gel (Davison Chemical Division of W. R. Grace & Co.), a finely divided hydrated silica gel (SA~900 $m^2$/gm). The mixture was stirred for one hour at room temperature, then filtered. The filtered material, a damp powder, contained 2.84 wt % phosphorus (in the form of $PO_4$) and approximately 66.0 wt % water. This preparation was designated Adsorbent II.

EXAMPLE III (Preparation of Sulfuric Acid/Silica Alumina and Magnesium Sulfate/Silica Alumina Adsorbents)

A sulfuric acid solution was prepared by adding 1.5 gm concentrated $H_2SO_4$ to 18.0 gm de-ionized water. This solution was sprayed onto 35.7 gm of a porous, amorphous silica alumina powder, available from the Davison Chemical Division of W. R. Grace & Co. as Low Alumina ™ cracking catalyst (SA~450 m²/gm). This preparation was designated Adsorbent IIIA. A similar preparation was made using 5 wt % $MgSO_4$ as the acid, and was designated Adsorbent IIIB.

EXAMPLE IV (Preparation of Hydrochloric Acid/Silica Gel Adsorbent)

An adsorbent was prepared as described in Example I, with the substitution of 5 wt % HCl for the 5 wt % $H_2SO_4$. This preparation was designated Adsorbent IV.

EXAMPLE V (Preparation of Aluminum Chloride/Silica Gel Adsorbent)

An adsorbent was prepared as described in Example I, with the substitution of 5 wt % $AlCl_3$ for the 5 wt % $H_2SO_4$. This preparation was designated Adsorbent V.

EXAMPLE VI (Evaluation Procedures)

Evaluations of all materials were carried out using the following procedures. In each case, a 100 gm sample of oil was preheated to 100° C. The adsorbent material to be tested was then added to the oil in the quantities indicated in Tables III - X. The oil/adsorbent slurry was then maintained at 100° C for 30 minutes with agitation. The oil was filtered to remove the adsorbent prior to analysis.

Chlorophyll, red and yellow color values were determined by using a Lovibond ™ Tintometer ™ AF960 (The Tintometer Company). For soybean oil, a one inch cell size was used; for canola oil, a one centimeter cell size was used. For red and yellow, color was measured according to the AOCS color scales as described above. For chlorophyll A, color was measured in ppm. The oil samples were analyzed by inductively coupled plasma ("ICP") emission spectroscopy for phosphorus levels.

EXAMPLE VII

Adsorbent IA was evaluated for removal of color (chlorophyll A, red and yellow) from caustic refined soybean oil. Treatment and analysis were according to the procedures of Example VI. The color properties of the untreated oil are indicated in Table III. Samples of the oil were treated with a commercial acid-activated montmorillonite bleaching earth for comparison with the adsorbent of this invention. The results are shown in Table III.

TABLE III

| Material | Loading (wt %) Dry Basis | Loading (wt %) As-Is | Chl A (ppm) | Red (ppm) | Yellow (ppm) |
|---|---|---|---|---|---|
| Control | — | — | .33 | 3.2 | 70+ |
| Adsorbent IA | .2 | .37 | .22 | 3.8 | 70+ |
| Adsorbent IA | .5 | .94 | .00 | 1.4 | 21 |
| Adsorbent IA | 1.0 | 1.88 | .00 | 1.0 | 9 |
| Bleaching Earth | .2 | .26 | .09 | 2.0 | 70+ |

TABLE III-continued

| Material | Loading (wt %) Dry Basis | Loading (wt %) As-Is | Chl A (ppm) | Red (ppm) | Yellow (ppm) |
|---|---|---|---|---|---|
| Bleaching Earth | .5 | .64 | .01 | .9 | 15 |
| Bleaching Earth | 1.0 | 1.28 | .00 | .5 | 4 |

EXAMPLE VIII

Adsorbents IA-D, IV and V were evaluated for removal of color (chlorophyll A, red and yellow) from acid degummed canola oil. The color properties of the untreated oil are indicated in Table IV. Samples of the oil were treated with the commercial bleaching earth of Example VII for comparison with the adsorbents of this invention. As an additional comparison, the acid/water component of Adsorbent IA was used to treat the oils, with the $H_2SO_4/H_2O$ additions equivalent to 0.5 and 1.0% loadings of Adsorbent IA. A further comparison was made using equivalent $H_2SO_4/H_2O$ additions, followed by equivalent silica gel additions (sequential treatment). Treatment and analysis were according to the procedures in Example VI, with the omission of the filtration step for the $H_2SO_4/H_2O$ treatments. The results are shown in Table IV.

TABLE IV

| Material | Loading (wt %) Dry Basis | Loading (wt %) As-Is | Chl A (ppm) | Red (ppm) | Yellow (ppm) |
|---|---|---|---|---|---|
| Control | — | — | 13.80 | 11.0 | 70+ |
| Adsorbent IA | .2 | | 11.40 | 6.2 | 70+ |
| Adsorbent IA | .5 | .90 | 2.69 | 4.3 | 70+ |
| Adsorbent IA | 1.0 | 1.88 | .06 | .7 | 5.8 |
| Adsorbent IB | .2 | | 12.10 | 9.0 | 70+ |
| Adsorbent IB | .5 | | 3.06 | 4.6 | 70+ |
| Adsorbent IB | 1.0 | | .02 | 0.6 | 5.0 |
| Adsorbent IC | .2 | | 7.51 | 6.5 | 70+ |
| Adsorbent IC | .5 | | .20 | 1.0 | 70+ |
| Adsorbent IC | 1.0 | | .00 | .7 | 8.4 |
| Adsorbent ID | .2 | | 12.00 | 6.3 | 70+ |
| Adsorbent ID | .5 | | 1.84 | 4.7 | 70+ |
| Adsorbent ID | 1.0 | | .08 | 0.8 | 7.1 |
| Bleaching Earth | .2 | .26 | 10.10 | — | — |
| Bleaching Earth | .5 | .64 | 5.47 | 6.7 | 70+ |
| Bleaching Earth | 1.0 | 1.28 | 1.04 | 1.8 | 29 |
| $H_2SO_4/H_2O$ | — | (a) | 12.90 | 8.3 | 70+ |
| $H_2SO_4/H_2O$ | — | (b) | 13.30 | 7.8 | 70+ |
| Sequential | — | (a) | 13.80 | — | — |
| Sequential | — | (b) | 12.30 | — | — |
| Adsorbent IV | .5 | | 12.40 | | |
| Adsorbent IV | 1.0 | | 5.59 | | |
| Adsorbent V | .5 | | 11.25 | | |
| Adsorbent V | 1.0 | | 4.10 | | |

(a) Equivalent to .5 wt % Adsorbent IA.
(b) Equivalent to 1.0 wt % Adsorbent IA.

EXAMPLE IX

Adsorbent IA was evaluated for the ability to simultaneously remove phospholipids and chlorophyll from acid degummed canola oil, according to the procedures of Example IV. For comparison purposes, this oil also was treated with Tri-Syl ™ (Davison Chemical Division of W. R. Grace & Co.), a commercially available amorphous silica gel adsorbent used for the removal of phospholipids. Treatment and analysis were according to the procedures of Example VI. The results are shown in Table V.

TABLE V

| Material | Loading (wt %) Dry Basis | Loading (wt %) As-Is | Chl A (ppm) | P (ppm) |
|---|---|---|---|---|
| Control | — | — | 24.60 | 18.4 |

TABLE V-continued

| Material | Loading (wt %) Dry Basis | Loading (wt %) As-Is | Chl A (ppm) | P (ppm) |
|---|---|---|---|---|
| Adsorbent IA | .5 | .93 | .22 | 2.3 |
| Tri-Syl ™ | .3 | .86 | — | 10.2 |
| Tri-Syl ™ | .6 | 1.71 | — | 3.1 |

EXAMPLE X

The experiment of Example VII was repeated, comparing Adsorbent IA with the commercial bleaching earth of Example VII, in the treatment of acid degummed canola oil. Treatment and analysis were according to the procedures of Example VI. The results are shown in Table VI.

TABLE VI

| Material | Loading (wt %) Dry Basis | Loading (wt %) As-Is | Chl A (ppm) | P (ppm) |
|---|---|---|---|---|
| Control | — | — | 22.80 | 18.5 |
| Adsorbent IA | .2 | .4 | 15.70 | 6.2 |
| Adsorbent IA | .5 | 1.0 | .14 | 1.4 |
| Adsorbent IA | 1.0 | 2.0 | .02 | 0.5 |
| Bleaching Earth | .2 | .26 | 14.9 | 12.5 |
| Bleaching Earth | .5 | .64 | 6.8 | 10.9 |
| Bleaching Earth | 1.0 | 1.28 | 1.4 | 8.7 |
| Bleaching Earth | 2.0 | 2.56 | .1 | 5.5 |

EXAMPLE XI

Adsorbent IA was compared with the commercial bleaching earth of Example VII in treatment of caustic refined soybean oil according to the procedures of Example IV. Treatment and analysis were according to the procedures of Example VI. The results are shown in Table VII.

TABLE VII

| Material | Loading (wt %) Dry Basis | Loading (wt %) As-Is | Chl A (ppm) | P (ppm) |
|---|---|---|---|---|
| Control | — | — | .31 | 1.26 |
| Adsorbent IA | .1 | .2 | .25 | .90 |
| Adsorbent IA | .2 | .4 | .16 | — |
| Adsorbent IA | .5 | 1.0 | .00 | .70 |
| Adsorbent IA | 1.0 | 2.0 | .00 | .10 |
| Bleaching Earth | .1 | .13 | .17 | .75 |
| Bleaching Earth | .2 | .22 | .06 | .60 |
| Bleaching Earth | .5 | .64 | .02 | .51 |

EXAMPLE XII

The effect of pretreatment of the oil with amorphous silica prior to treatment with the adsorbent of this invention was evaluated. Pretreatment was with Tri-Syl ™ (Davison Chemical Division of W. R. Grace & Co.), a commercially available amorphous silica gel. Adsorbent IA was the test material and the commercial bleaching earth of Example VII was used for comparison purposes. The procedures of Example VI were followed, with the exception of the Tri-Syl ™ pretreatment prior to bleaching with Adsorbent IA or bleaching earth. The results are shown in Table VIII.

TABLE VIII

| TriSyl ™ Pretreatment | Bleaching Material | Loading (wt % db) | Chl A (ppm) | P (ppm) |
|---|---|---|---|---|
| A. Acid Degummed Canola Oil | | | | |
| Control | — | — | 13.70 | |
| 1.0 | — | — | 13.70 | |
| — | Adsorbent IA | .2 | 11.40 | |
| — | Adsorbent IA | .5 | 2.69 | |
| — | Adsorbent IA | 1.0 | .08 | |
| 1.0 | Adsorbent IA | .2 | 8.40 | |
| 1.0 | Adsorbent IA | .5 | .39 | |
| 1.0 | Adsorbent IA | 1.0 | .06 | |
| B. Acid Degummed Canola Oil | | | | |
| Control | — | — | 22.80 | 18.5 |
| .3 | — | — | 22.00 | 6.1 |
| .6 | — | — | 21.20 | 3.7 |
| — | Bleaching Earth | .75 | 5.17 | 9.8 |
| — | Bleaching Earth | 1.50 | .34 | 6.2 |
| — | Bleaching Earth | 3.00 | .13 | 3.1 |
| .6 | Bleaching Earth | .75 | .55 | |
| .6 | Bleaching Earth | 1.50 | .07 | |
| .6 | Bleaching Earth | 3.00 | .01 | |

EXAMPLE XIII

Adsorbent II was evaluated for removal of chlorophyll A from caustic refined soybean oil, following the methods of Example VI. The results are shown in Table IX.

TABLE IX

| Material | Loading (wt %) Dry Basis | Chl A (ppm) |
|---|---|---|
| Control | — | .41 |
| Adsorbent II | .1 | .36 |
| Adsorbent II | .2 | .31 |
| Adsorbent II | .4 | .22 |
| Adsorbent II | .5 | .10 |

EXAMPLE XIV

Adsorbents IIIA and IIIB were evaluated for removal of chlorophyll A from acid degummed canola oil, following the methods of Example VI. The results are shown in Table X.

TABLE X

| Material | Loading (wt %) Dry Basis | Chl A (ppm) |
|---|---|---|
| Control | — | 23.5 |
| Adsorbent IIIA | .2 | 17.6 |
| Adsorbent IIIA | .5 | 11.7 |
| Adsorbent IIIA | 1.0 | 3.9 |
| Adsorbent IIIB | .2 | 21.7 |
| Adsorbent IIIB | .5 | 16.4 |
| Adsorbent IIIB | 1.0 | 8.9 |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. An acid-treated amorphous silica adsorbent comprising a high surface area amorphous silica on which is supported an inorganic acid, an acid salt or a strong organic acid having a $pK_a$ of about 3.5 or lower, said adsorbent characterized in having an acidity factor of at least about $2.0 \times 10^{-8}$ and a pH of about 3.0 or lower.

2. The adsorbent of claim 1 in which said amorphous silica is a silica hydrogel, silica xerogel, precipitated silica, fumed silica, dialytic silica or silica alumina.

3. The adsorbent of claim 1 in which said amorphous silica has a surface area of at least about 200 square meters per gram.

4. The adsorbent of claim 1 which has an acid content of about 3.0 to about 10.0 weight percent, based on the dry weight of the silica.

5. The adsorbent of claim 1 in which said acid is an inorganic acid.

6. The adsorbent of claim 5 in which said inorganic acid is sulfuric acid, phosphoric acid or hydrochloric acid.

7. The adsorbent of claim 6 in which said inorganic acid is sulfuric acid and said sulfuric acid is supported on said amorphous silica in a concentration of about 5 weight percent, or greater, based on the dry weight of the silica.

8. The adsorbent of claim 1 in which said acid is a strong organic acid.

9. The adsorbent of claim 8 in which said strong organic acid is toluene sulfonic acid or trifluoroacetic acid.

10. The adsorbent of claim 1 in which said acid is an acid salt.

11. The adsorbent of claim 10 in which said acid salt is magnesium sulfate or aluminum chloride.

12. The adsorbent of claim 1 in which the total volatiles content of said adsorbent is between about 10 and about 80 weight percent.

13. The adsorbent of claim 12 in which said total volatiles content is between about 40 and about 80 weight percent.

14. A composition suitable for use in the removal of trace contaminants, specifically phospholipids or chlorophyll or both, from glyceride oils, comprising high surface area amorphous silica whose pores contain an inorganic acid, an acid salt or a strong organic acid having a $pK_a$ of about 3.5 or lower.

15. A composition of claim 14 which is characterized by having an acidity factor of at least about $2.0 \times 10^{-8}$ and a pH of about 3.0 or lower.

16. The composition of claim 14 which has an acid content of about 3.0 to about 10.0 weight percent, based on the dry weight of the silica.

17. The composition of claim 14 in which said acid is sulfuric acid.

18. The composition of claim 17 in which said sulfuric acid is supported on the amorphous silica in a concentration of about 5.0 weight percent, or greater, based on the dry weight of the silica.

19. A composition suitable for use in the removal of color from glyceride oils comprising high surface area amorphous silica on which is supported an inorganic acid, an acid salt or a strong organic acid having a $pk_a$ of about 3.5 or lower, said composition characterized by having an acidity factor of at least about $2.0 \times 10^{-8}$ and a pH of about 3.0 or lower.

20. The composition of claim 19 in which said acid is sulfuric acid.

* * * * *

UNITED STATES PATENT AND TRADEMARK OFFICE
CERTIFICATE OF CORRECTION

PATENT NO. : 4,877,765
DATED : October 31, 1989
INVENTOR(S) : James N. Pryor; James M. Bogdanor; William A. Welsh It is certified that error appears in the above-identified patent and that said Letters Patent is hereby corrected as shown below:

Cover Page (Assignee):

Delete "W. R. Grace & Co., New York, N.Y."

Insert --W. R. Grace & Co.-Conn., New York, N.Y.--

Signed and Sealed this

Sixth Day of November, 1990

Attest:

HARRY F. MANBECK, JR.

Attesting Officer

Commissioner of Patents and Trademarks